Figure 1:
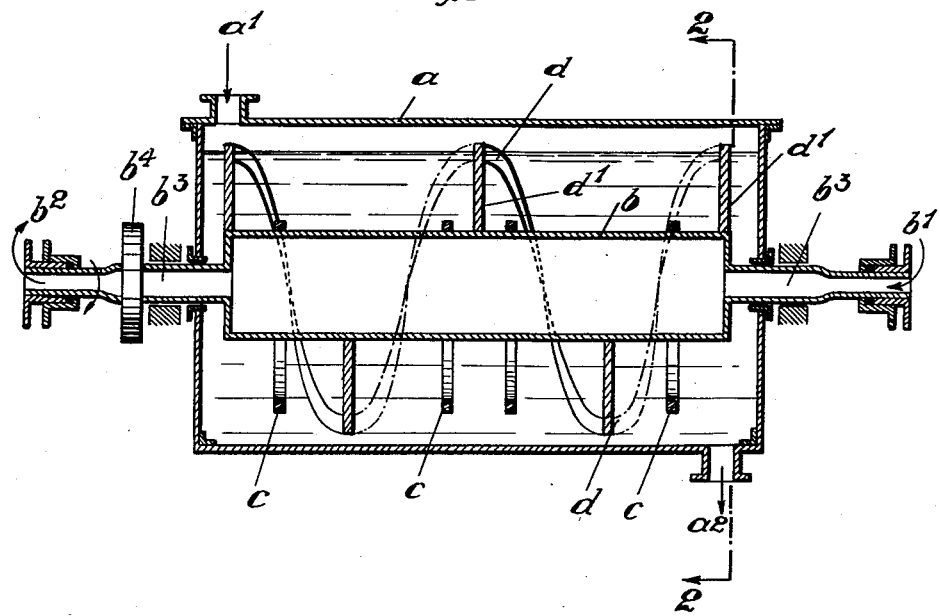

March 20, 1934.　　H. G. CARTOUX　　1,951,923

CRYSTALLIZER

Filed Dec. 30, 1932

INVENTOR
HENRI GASPARD CARTOUX
by his attorneys
Howson and Howson

Patented Mar. 20, 1934

1,951,923

UNITED STATES PATENT OFFICE 1,951,923

CRYSTALLIZER

Henri Gaspard Cartoux, Tarascon-sur-Ariege, France, assignor to Compagnie de Produits Chimiques et Electrometallurgiques Alais, Froges et Camargue, Paris, France, a corporation of France Application December 30, 1932, Serial No. 649,665
In Germany January 2, 1932

5 Claims. (Cl. 23—273)

The crystallizers employed hitherto, when treating concentrated saline solutions with the object of causing them to crystallize by cooling, are at present few in number and all defective, for they allow only with difficulty of collecting the desired output of sound crystals usable without further treatment.

Among the crystallizers most currently employed there is found in the first place the "Baudelot" type in which there is utilized the trickling of the liquid to be cooled over a tube nest cooled internally by circulation of a brine.

This device presents the disadvantage, since the hot liquid trickles over the cold tubes, of producing crystalline formations upon these tubes.

Another crystallizer employed, particularly for the crystallization of salts of soda and potash, consists in passing air under pressure through a copper cylinder, immersed in the brine to be cooled.

This apparatus presents in particular the disadvantage of fouling the treated liquid in consequence of the impurities and the oil which compressed air always contains.

There have also been proposed crystallizers in which there are employed scrapers, knives or any other mechanical devices for removing the crystals which have already been deposited upon the metallic walls. In this case, there is necessarily formed, in the fairly long interval of time which elapses between two consecutive actions of a scraper, a crystalline layer upon the external wall of the cylinder or drum; this layer, which must be broken up in order to be removed, can only be collected in a compact mass which destroys the structure of the crystals.

The crystallizing apparatus according to the invention comprises a cylinder revolving in the liquid to be cooled and traversed by the cooling liquid, this cylinder supporting freely one or more rings which are of a diameter considerably greater than that of the cylinder.

In consequence of the movement of rotation of the cylinder, these rings are possessed by two movements: a movement of rotation by being driven by friction by the cylinder and a movement of translation which, by the rubbing and the exceedingly light shocks produced upon the wall of the cylinder, prevents the formation and development of crystalline formations on the surface of the cylinder.

These rings revolving less quickly than the cylinder act by extremely gentle shocks upon the latter and the effect produced is quite different from a scraping action.

By their operation the floating rings maintain the crystallizer constantly in the optimum conditions of operation.

In fact, in a saturated and hot solution, set out to be crystallized, the crystals normally produced, even in an agitated medium, originate in the immediate vicinity of the cold wall, where the temperature of the solution is lowered to a figure approximate to its point of precipitation.

The floating rings maintain this meta-stable zone in continual agitation, and the crystals are thus prevented from precipitating upon the cold cylinder, and by gravity they collect upon the bottom of the apparatus where they are collected in their primitive state.

The crystallizer is preferably provided with a device for agitation of the liquid mass; this device can be constituted by a helix fixed at a certain distance from the rotary cylinder. The energetic stirring produced by this helix, multiplying greatly the liquid surfaces in contact with the air, has the advantage of presenting to the liquid a large surface of exchange with the ambient air.

In comparison with other crystallizers at present utilized, the crystallizer according to the invention allows of reducing by at least five times the duration of an operation and therefore of multiplying by five the output and it allows of obtaining crystals not presenting themselves in the mass and adapted to be utilized without further treatment.

The accompanying drawing represents by way of example one form of carrying out the object of the invention.

Figure 2:
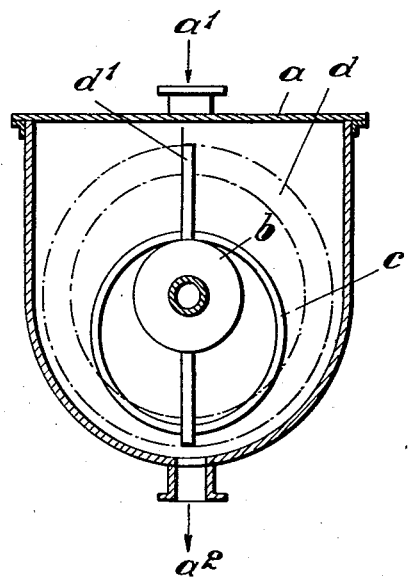

Figure 1 is a view in axial, longitudinal, vertical section of the crystallizer and Figure 2 is a view in transverse, vertical section along the line 2—2 of Figure 1.

The liquid to be cooled, that is to say, the concentrated saline solution to be crystallized, penetrates at $a^1$ into a vessel $a$ and leaves the latter at $a^2$; in this liquid there is immersed and there revolves a cylinder $b$ traversed by a suitable cooling liquid, for example water, penetrating at $b^1$ and leaving at $b^2$; this cylinder $b$ conveniently journalled at $b^3$ $b^3$ receives a movement of rotation around its axis, in any suitable manner, for example by the pulley $b^4$.

Upon the cylinder $b$ are mounted freely, from distance to distance, rings $c$ which are of a diameter considerably greater than that of the cylinder, these rings may have a square, trapezoidal or any other transverse section.

These rings are preferably constituted by a metal less hard than that of the rotary cylinder *b* or covered with a wearing coat. The rotary cylinder can with advantage be made of copper, by reason of the high thermal conductivity of the latter. When several rings are employed it is necessary to separate them one from another by stops, in order to limit the stroke.

In the form of construction represented, these stops are constituted by the supports $d^1$ of a helix *d* disposed at a certain distance from the rotating cylinder *b*.

The cooling liquid may be either water, or brine or a mother liquor utilized in the cycle of operations and becoming heated in the course of its passage in the cooling cylinder, thus allowing of recuperating a considerable number of heat units.

It is possible by means of this crystallizer to modify the dimensions of the crystals produced, by acting either upon the speed of flow of the refrigerating liquid, or upon the number of revolutions of the cylinder *b* and the helix *d*, or upon the speed of cooling.

This apparatus has given very good results, for example for the crystallization of chlorates.

What I claim is:

1. A crystallizer, comprising in combination a vessel, adapted to contain the saline solution to be crystallized, a cylinder rotatably mounted in said vessel and immersed in said solution and adapted to be traversed by a cooling liquid, means for rotating said cylinder around its axis, and ring members, supported freely upon said cylinder.

2. A crystallizer, comprising in combination a vessel, adapted to contain the saline solution to be crystallized, a cylinder rotatably mounted in said vessel and immersed in said solution and adapted to be traversed by a cooling liquid, means for rotating said cylinder around its axis, and ring members, of a diameter considerably greater than that of the cylinder, supported freely upon said cylinder.

3. A crystallizer, comprising in combination a vessel, adapted to contain the saline solution to be crystallized, a cylinder rotatably mounted in said vessel and immersed in said solution and adapted to be traversed by a cooling liquid, means for rotating said cylinder around its axis, ring members, supported freely upon said cylinder, and means for agitating the liquid mass in said vessel.

4. A crystallizer, comprising in combination a vessel, adapted to contain the saline solution to be crystallized, a cylinder rotatably mounted in said vessel and immersed in said solution and adapted to be traversed by a cooling liquid, means for rotating said cylinder around its axis, ring members, supported freely upon said cylinder, and a helix, rigidly connected to said cylinder and spaced some distance therefrom, for agitating the liquid mass in said vessel.

5. A crystallizer, comprising in combination a vessel, adapted to contain the saline solution to be crystallized, a cylinder rotatably mounted in said vessel and immersed in said solution and adapted to be traversed by a cooling liquid, means for rotating said cylinder around its axis, ring members, supported freely upon said cylinder, and stops carried by said cylinder for limiting the movement of the ring members longitudinally to the cylinder.

HENRI GASPARD CARTOUX.